(12) United States Patent (10) Patent No.: US 9,418,011 B2
Soares et al. (45) Date of Patent: Aug. 16, 2016

(54) REGION BASED TECHNIQUE FOR ACCURATELY PREDICTING MEMORY ACCESSES

(75) Inventors: Livio B. Soares, Toronto (CA); Naveen Cherukuri, San Jose, CA (US); Akhilesh Kumar, Sunnyvale, CA (US); Mani Azimi, Menlo Park, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 12/821,935

(22) Filed: Jun. 23, 2010

(65) Prior Publication Data

US 2011/0320762 A1 Dec. 29, 2011

(51) Int. Cl.
*G06F 12/00* (2006.01)
*G06F 13/00* (2006.01)
*G06F 13/28* (2006.01)
*G06F 12/08* (2016.01)
*G06F 12/10* (2016.01)

(52) U.S. Cl.
CPC ............ *G06F 12/0862* (2013.01); *G06F 12/10* (2013.01); *G06F 12/1027* (2013.01); *G06F 2212/6024* (2013.01)

(58) Field of Classification Search
CPC . G06F 12/0862; G06F 12/10; G06F 12/1027; G06F 2212/6024
USPC .......................................... 711/207, E12.061
See application file for complete search history.

(56) References Cited

U.S. PATENT DOCUMENTS

| 5,752,261 | A | * | 5/1998 | Cochcroft, Jr. ...... G06F 12/0864 711/128 |
| 5,931,945 | A | * | 8/1999 | Yung et al. .................... 712/300 |
| 5,941,981 | A | | 8/1999 | Tran |
| 5,960,454 | A | * | 9/1999 | Mandal et al. ................ 711/118 |
| 6,047,363 | A | * | 4/2000 | Lewchuk ............ G06F 12/0862 711/137 |
| 6,055,621 | A | * | 4/2000 | Puzak ........................... 712/207 |
| 6,223,309 | B1 | * | 4/2001 | Dixon et al. .................. 714/703 |
| 6,317,810 | B1 | * | 11/2001 | Lopez-Aguado et al. .... 711/120 |
| 6,473,836 | B1 | * | 10/2002 | Ikeda ............................ 711/137 |
| 6,523,093 | B1 | | 2/2003 | Bogin |
| 6,535,966 | B1 | | 3/2003 | Cherabuddi et al. |
| 6,640,285 | B1 | * | 10/2003 | Bopardikar et al. .......... 711/133 |

(Continued)

FOREIGN PATENT DOCUMENTS

| JP | H04259048 | 9/1992 |
| JP | 2005302034 | 10/2005 |

(Continued)

OTHER PUBLICATIONS

International Search Report and Written Opinion for PCT Patent Application No. PCT/US2011/041511, mailed on Feb. 17, 2012, 9 pages.

(Continued)

*Primary Examiner* — Sheng-Jen Tsai
(74) *Attorney, Agent, or Firm* — Trop, Pruner & Hu, P.C.

(57) ABSTRACT

In one embodiment, the present invention includes a processor comprising a page tracker buffer (PTB), the PTB including a plurality of entries to store an address to a cache page and to store a signature to track an access to each cache line of the cache page, and a PTB handler, the PTB handler to load entries into the PTB and to update the signature. Other embodiments are also described and claimed.

17 Claims, 4 Drawing Sheets

(56) References Cited

U.S. PATENT DOCUMENTS

| | | | |
|---|---|---|---|
| 6,678,795 B1* | 1/2004 | Moreno et al. | 711/137 |
| 6,804,769 B1 | 10/2004 | Carlson | |
| 7,467,131 B1* | 12/2008 | Gharachorloo et al. | |
| 7,480,769 B2* | 1/2009 | Diefendorff | G06F 12/0862 711/137 |
| 7,496,730 B2* | 2/2009 | Wang et al. | 711/206 |
| 7,975,108 B1* | 7/2011 | Holscher et al. | 711/137 |
| 8,332,587 B2* | 12/2012 | Luick | 711/122 |
| 2001/0001873 A1* | 5/2001 | Wickeraad et al. | 711/136 |
| 2002/0073282 A1* | 6/2002 | Chauvel et al. | 711/122 |
| 2003/0191900 A1* | 10/2003 | Hooker | G06F 9/30047 711/137 |
| 2005/0172082 A1* | 8/2005 | Liu et al. | 711/144 |
| 2007/0022422 A1* | 1/2007 | Tirumalai et al. | 718/100 |
| 2007/0198779 A1* | 8/2007 | Wang | 711/136 |
| 2008/0235458 A1 | 9/2008 | van Riel | |
| 2008/0282032 A1* | 11/2008 | Shen et al. | 711/117 |
| 2009/0006800 A1* | 1/2009 | Bellofatto et al. | 711/170 |
| 2009/0182947 A1 | 7/2009 | van Riel | |
| 2009/0276572 A1* | 11/2009 | Heil et al. | 711/118 |
| 2010/0235579 A1* | 9/2010 | Biles et al. | 711/125 |
| 2010/0262750 A1* | 10/2010 | Deshpande et al. | 711/3 |
| 2010/0306473 A1* | 12/2010 | Luick | 711/122 |
| 2010/0306474 A1* | 12/2010 | Luick | 711/122 |
| 2012/0198176 A1* | 8/2012 | Hooker | G06F 12/0862 711/137 |
| 2015/0309936 A1* | 10/2015 | Hooker | G06F 12/0862 711/137 |

FOREIGN PATENT DOCUMENTS

| | | |
|---|---|---|
| JP | 2007122667 | 5/2007 |
| JP | 2008102745 | 5/2008 |
| WO | WO 01/88717 | 11/2001 |
| WO | 2011/163407 A2 | 12/2011 |
| WO | 2011/163407 A3 | 4/2012 |

OTHER PUBLICATIONS

Taiwanese Patent Office, Office Action mailed Apr. 8, 2014 in Taiwan application No. 100121833.

European Patent Office, Office Action mailed Mar. 4, 2014 in European application No. 11798876.6.

Japanese Patent Office, "Decision of Rejection," in Patent Application 2013-516745, Translation by Ryuka Law Firm, Aug. 12, 2014.

Taiwanese Patent Office, Office Action dated Nov. 5, 2014 in Taiwan application No. 100121833.

Chinese Patent Office, Chinese Office Action mailed Apr. 30, 2015 in Chinese Patent Application No. 201180041024.6.

State Intellectual Property Office of the People's Republic of China, Second Chinese Office Action mailed Nov. 25, 2015 Application No. 201180041024.6.

China State Intellectual Property Office, Third Office Action mailed Mar. 21, 2016 in Chinese Patent Application No. 201180041024.6.

* cited by examiner

112

| Bit27...Bit0 | Bit63...Bit0 | Bit63...Bit0 |
|---|---|---|
| Address 202 | Access Signature 204 | Reuse Signature 206 |
| | | |
| | | |

Index 208

FIG. 2

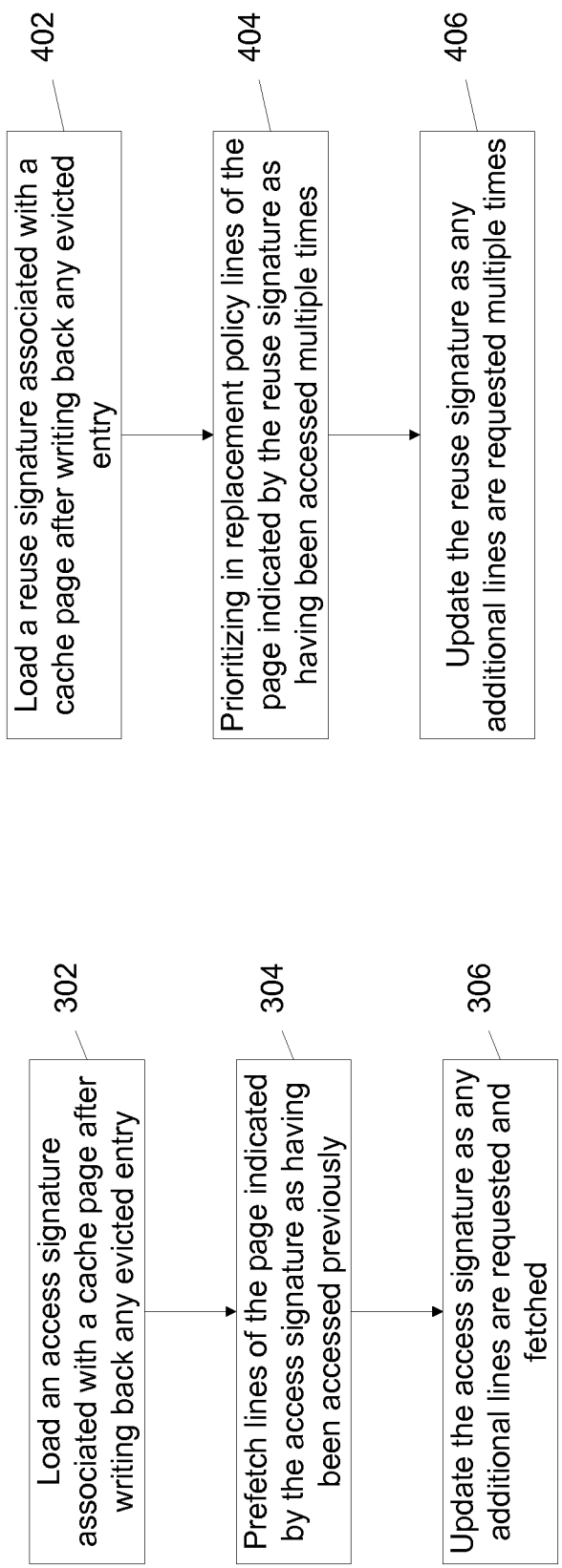

REGION BASED TECHNIQUE FOR ACCURATELY PREDICTING MEMORY ACCESSES

BACKGROUND

In order to improve the performance and efficiency of computing systems, for example PC's, servers, etc., prefetching data and instructions that a processor may need at a later time is considered beneficial. However, conventional prefetching has not been able to accurately predict which cache lines should or should not be prefetched.

BRIEF DESCRIPTION OF THE DRAWINGS

FIG. 2 is a block diagram of an example page tracker buffer in accordance with an embodiment of the present invention.

FIG. 3 is a flow chart of an example method for utilizing an access signature in accordance with an embodiment of the present invention.

FIG. 4 is a flow chart of an example method for utilizing a reuse signature in accordance with an embodiment of the present invention.

DETAILED DESCRIPTION

In various embodiments, methods and apparatuses of predictive prefetching are presented. In the following description, for purposes of explanation, numerous specific details are set forth in order to provide a thorough understanding of the invention. It will be apparent, however, to one skilled in the art that embodiments of the invention can be practiced without these specific details. In other instances, structures and devices are shown in block diagram form in order to avoid obscuring the invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments.

Figure 1:
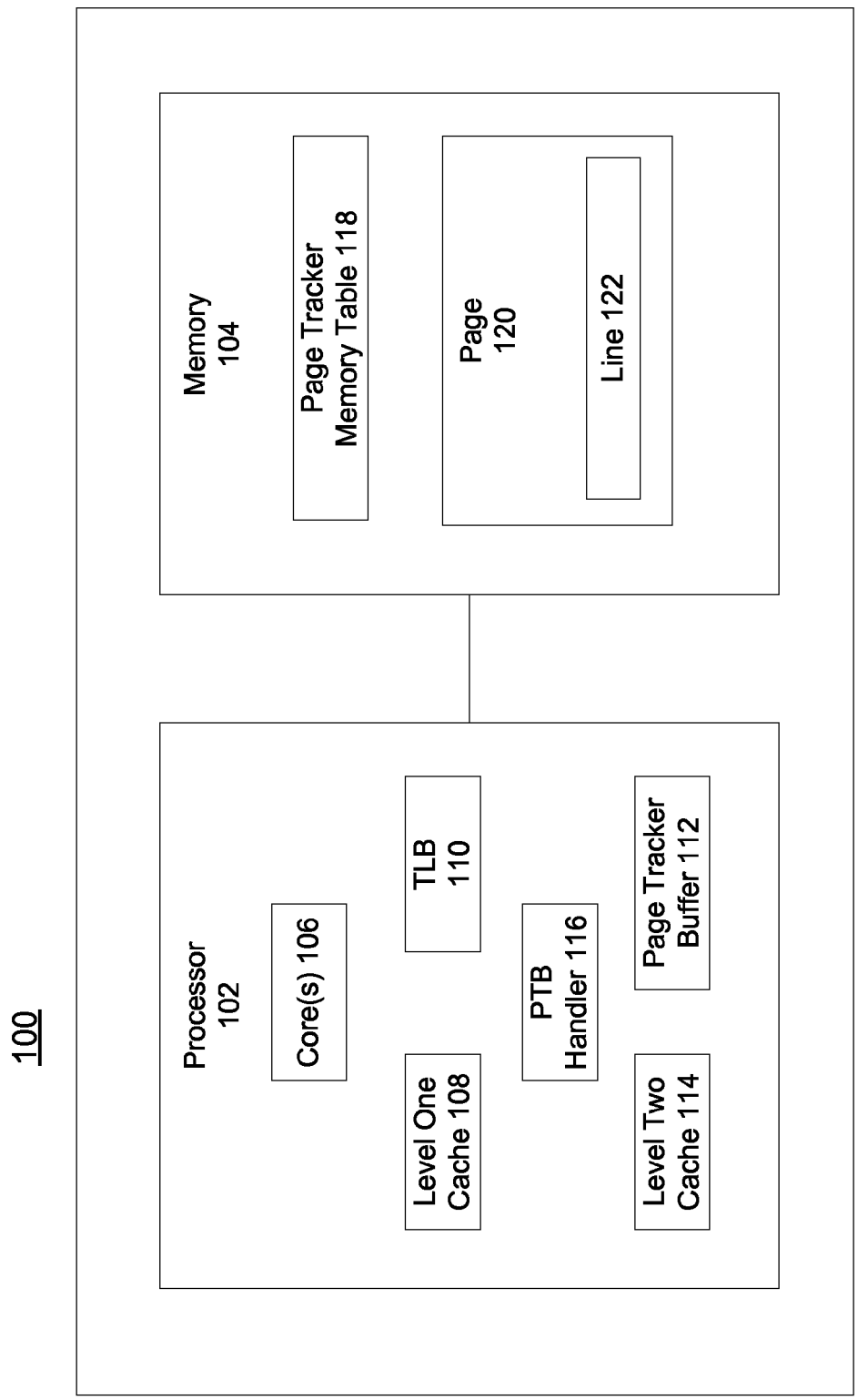
FIG. 1 is a block diagram of an example processor and memory in accordance with one embodiment of the present invention.

Referring now to FIG. 1, shown is a block diagram of an example processor and memory in accordance with one embodiment of the present invention. As shown in FIG. 1, system 100 may include processor 102 and memory 104. Processor 102 may include core(s) 106, level one cache 108, translation lookaside buffer (TLB) 110, page tracker buffer (PTB) 112, level two cache 114 and PTB handler 116. While shown as including level one cache 108 and level two cache 114, processor 102 may include any number of cache levels. Also, while processor 102 is shown as including TLB 110, which can store address translations from a virtual address to a physical address, the present invention may be practiced in a processor without a TLB.

PTB 112 may contain entries, as shown in greater detail in reference to FIG. 2, that indicate which portions of specific memory regions (for example, which cache lines of specific cache pages or other memory regions) have been accessed previously by core(s) 106. In one embodiment, PTB 112 also contains entries that indicate which cache lines of specific cache pages have been accessed multiple times by core(s) 106, potentially indicating those cache lines that may be most desirable to remain resident in cache.

PTB handler 116 may attempt to accurately predict the instructions and data that will be needed by core(s) 106, as described in more detail hereinafter. In one embodiment, PTB handler 116 prefetches those cache lines of a cache page added to TLB 110 (for example after a TLB miss) that PTB 112 indicates were accessed during a prior instantiation. PTB handler 116 may read PTB 112 entries from, and write back PTB 112 entries to, page tracker memory table 118. PTB handler 116 may also update entries in PTB 112, for example as additional cache lines are accessed by core(s) 106. PTB handler 116 may be implemented in other hardware, such as a prefetch module, or software or a combination of hardware and software. PTB handler 116 may be applied to data and instruction prefetching independently and may co-exist with other prefetchers.

Memory 104 may represent any type of memory, such as static or dynamic random access memory (RAM). In one embodiment, memory 104 represents double data rate synchronous dynamic RAM (DDR-SDRAM), however the present invention is not limited to any type of memory. Memory 104 may be logically divided into pages, such as page 120, for caching and addressing. Each page 120 may contain a fixed number of lines 122. In one embodiment, page 120 contains 64 lines 122. In another embodiment, page 120 represents a memory region whose size may be configurable through firmware or software.

Referring now to FIG. 2, shown is a block diagram of an example page tracker buffer in accordance with an embodiment of the present invention. As shown in FIG. 2, page tracker buffer 112 may include any number of entries, accessible through index 208, which each may include address 202, access signature 204, and reuse signature 206. In one embodiment, PTB 112 may include a same number of entries as TLB 110. In other embodiments, PTB 112 may include more or fewer entries than TLB 110. In one embodiment, PTB 112 may include 64 entries. In another embodiment, PTB 112 may include 1024 entries.

While shown as including 28 bits, address 202 may contain more or fewer bits for identifying a page 120 (or another memory region). While shown as including 64 bits, access signature 204 and reuse signature 206 may contain more or fewer bits for identifying lines 122 of a page 120. In one embodiment, set bits of access signature 204 indicate the lines 122 of page 120 that were accessed by core(s) 106 in a prior addressing of page 120 in TLB 110. In one embodiment, set bits of reuse signature 206 indicate the lines 122 of page 120 that were accessed multiple times by core(s) 106 in a prior addressing of page 120 in TLB 110.

Referring now to FIG. 3, shown is a flow chart of an example method for utilizing an access signature in accordance with an embodiment of the present invention. As shown in FIG. 3, the method begins with PTB handler 116 loading (302) access signature 204 associated with a cache page 120 into PTB 112 after writing back any evicted entry to page tracker memory table 118. In one embodiment, PTB handler 116 loads access signature 204 after a TLB 110 miss and writes back any access signature being replaced. Next, PTB handler 116 may prefetch (304) lines 122, into level two cache 114, for example, indicated by access signature 204 as having been accessed by core(s) 106 previously. Lastly, PTB handler 116 may update (306) access signature 204. In one embodiment, PTB handler 116 adds bits to the retrieved access signature 204 as any additional lines are requested and fetched. In another embodiment, PTB handler 116 may use the retrieved access signature 204 for prefetching and may regenerate the access signature for writing back to memory to be used on a subsequent page access.

Referring now to FIG. 4, shown is a flow chart of an example method for utilizing a reuse signature in accordance with an embodiment of the present invention. As shown in FIG. 4, the method begins with PTB handler 116 loading (402) reuse signature 206 associated with a cache page 120 into PTB 112 after writing back any evicted entry to page tracker memory table 118. In one embodiment, PTB handler 116 loads reuse signature 206 after a TLB 110 miss. Next, PTB handler 116 may prioritize (404) replacement policy for those cache lines in level two cache 114 indicated by reuse signature 206 as having been accessed by multiple times by core(s) 106 previously. In one embodiment, PTB handler 116 may set as most recently used those cache lines with a bit set in reuse signature 206. In another embodiment, PTB handler 116 may set as least recently used those cache lines without a bit set in reuse signature 206. Lastly, PTB handler 116 may update (406) reuse signature 206 as any additional lines are requested multiple times.

Figure 5:
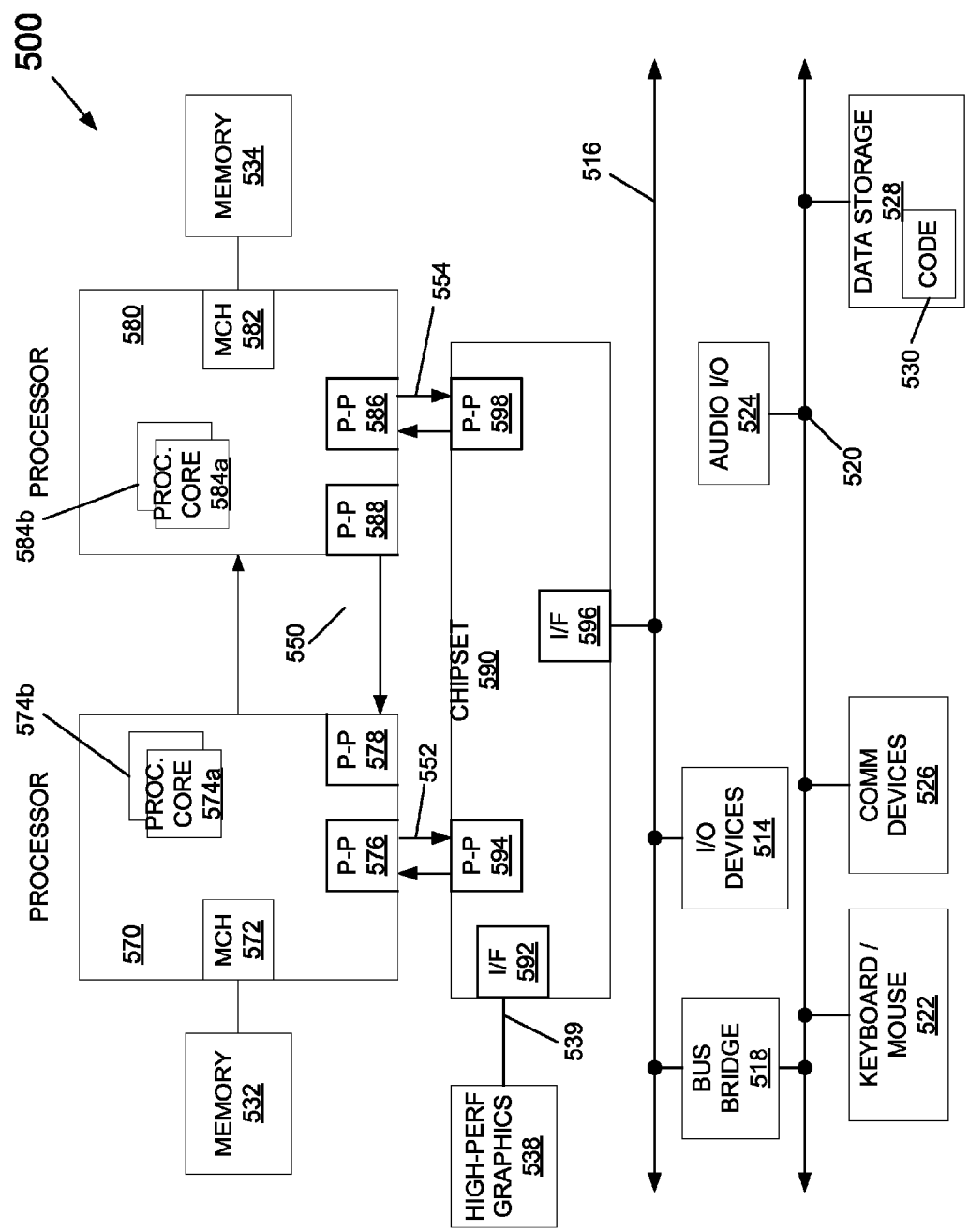
FIG. 5 is a block diagram of an example system in accordance with an embodiment of the present invention.

Embodiments may be implemented in many different system types. Referring now to FIG. 5, shown is a block diagram of a system in accordance with an embodiment of the present invention. As shown in FIG. 5, multiprocessor system 500 is a point-to-point interconnect system, and includes a first processor 570 and a second processor 580 coupled via a point-to-point interconnect 550. As shown in FIG. 5, each of processors 570 and 580 may be multicore processors, including first and second processor cores (i.e., processor cores 574a and 574b and processor cores 584a and 584b). Each processor may include PTB hardware, software, and firmware in accordance with an embodiment of the present invention.

Still referring to FIG. 5, first processor 570 further includes a memory controller hub (MCH) 572 and point-to-point (P-P) interfaces 576 and 578. Similarly, second processor 580 includes a MCH 582 and P-P interfaces 586 and 588. As shown in FIG. 5, MCH's 572 and 582 couple the processors to respective memories, namely a memory 532 and a memory 534, which may be portions of main memory (e.g., a dynamic random access memory (DRAM)) locally attached to the respective processors, each of which may include page tracker memory tables in accordance with one embodiment of the present invention. First processor 570 and second processor 580 may be coupled to a chipset 590 via P-P interconnects 552 and 554, respectively. As shown in FIG. 5, chipset 590 includes P-P interfaces 594 and 598.

Furthermore, chipset 590 includes an interface 592 to couple chipset 590 with a high performance graphics engine 538. In turn, chipset 590 may be coupled to a first bus 516 via an interface 596. As shown in FIG. 5, various I/O devices 514 may be coupled to first bus 516, along with a bus bridge 518 which couples first bus 516 to a second bus 520. Various devices may be coupled to second bus 520 including, for example, a keyboard/mouse 522, communication devices 526 and a data storage unit 528 such as a disk drive or other mass storage device which may include code 530, in one embodiment. Further, an audio I/O 524 may be coupled to second bus 520.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
a cache;
a first core coupled to the cache to execute a page tracker buffer handler; and
a page tracker buffer (PTB) having a plurality of entries, each to store an address of a page of a memory, an access signature to indicate lines of the page that were accessed by the first core in a prior access to the page, and a reuse signature to indicate lines of the page that were accessed at least twice by the first core in the prior access, wherein the page tracker buffer handler, responsive to a miss in a translation lookaside buffer (TLB) for a first page, is to load a first entry into the PTB, prefetch one or more lines of the first page according to the reuse signature of the first entry, and cause a first line of the first page to remain in the cache according to a replacement policy responsive to identification of the first line as having been accessed at least twice by the first core in the reuse signature of the first entry, wherein the first entry corresponds to the first page.

2. The processor of claim 1, wherein the PTB handler, when executed, is to load the entries into the PTB from a page tracker memory table in the memory.

3. The processor of claim 2, wherein the PTB handler, when executed, is further to store entries evicted from the PTB to the page tracker memory table.

4. The processor of claim 1, further including the translation lookaside buffer (TLB), wherein the PTB handler, when executed, is further to load the first reuse signature into the PTB after a first request to the TLB returns a first TLB miss.

5. A processor comprising:
a core to execute instructions to load one or more lines from a memory page of a memory into a cache; and
a page tracker buffer (PTB) to store a plurality of entries, each entry associated with a corresponding memory page of the memory, each entry to include an access signature to identify which lines of the corresponding memory page were previously accessed by the core in a prior access to the memory page and a reuse signature to indicate which lines of the memory page were accessed at least twice by the core in the prior access, wherein responsive to a miss in a translation lookaside buffer (TLB) for the memory page, a first entry of the PTB associated with a first line of the memory page is to be loaded, and responsive to an indication in the access signature and the reuse signature of the first entry of the PTB associated with a first line of the memory page of at least two accesses to the first line of the memory page, the first line is to be prefetched and identified as a candidate to remain in the cache according to a replacement policy.

6. The processor of claim 5, wherein a page tracker buffer (PTB) handler, when executed by the core, is to replace the first entry in the PTB with an updated first entry responsive to loading into the cache a line of the memory page.

7. The processor of claim 6, wherein the PTB handler, when executed, is further to prioritize according to the replacement policy, each line of the particular memory page that the corresponding reuse signature entry indicates as previously accessed multiple times.

8. The processor of claim 6, wherein the processor further comprises the translation lookaside buffer (TLB) and wherein the PTB handler is to load the first entry into the PTB upon the TLB miss.

9. A method comprising:
reading, by a processor, a first access signature and a first reuse signature associated with a first cache portion of a cache, the first reuse signature to indicate whether the processor accessed a first line of the first cache portion at least twice in a prior access, the first access signature to indicate whether the processor accessed the first line in the prior access; and
responsive to an indication in the first reuse signature that the first line has been accessed at least twice in the prior access, prefetching the first line and identifying the first line as a candidate to remain in the cache according to a replacement policy, wherein the first reuse signature is stored in an entry of a page tracker buffer (PTB) comprising a plurality of entries, each to store an address of a page of a memory coupled to the processor, an access signature to indicate lines of the page that were accessed by the processor in a prior access to the page, and a reuse signature to indicate lines of the page that were accessed at least twice by the processor in the prior access, the entry of the PTB to be loaded responsive to a translation lookaside buffer (TLB) miss for the page.

10. The method of claim 9, further comprising retrieving the first reuse signature from a table of signatures stored in the memory.

11. The method of claim 10, further comprising updating the first reuse signature in response to a second line of the first cache portion that is repeatedly accessed by the processor.

12. The method of claim 10, further comprising storing the first reuse signature to the table of signatures when the first line is evicted from the cache.

13. The processor of claim 1, wherein the PTB handler is to update the first reuse signature responsive to repeat access of a second line of the first page.

14. The processor of claim 6, wherein the PTB handler, when executed, is further to load the first entry from a page tracker memory table of the memory into the PTB.

15. The processor of claim 5, wherein a page tracker buffer (PTB) handler, when executed by the core, is to prefetch a second line of the memory page into the cache based at least in part on an access signature associated with the memory page, wherein the access signature is to indicate which lines of the memory page have been previously accessed by the core.

16. The processor of claim 15, wherein the PTB handler is to prefetch the second line into a level two cache of the cache.

17. The processor of claim 5, wherein a page tracker buffer (PTB) handler is to replace a first entry in the PTB with an updated first entry responsive to loading into the cache a line of a first memory page.

* * * * *